United States Patent [19]

Newby

[11] 4,407,637
[45] Oct. 4, 1983

[54] SOLAR POWERED LIQUID METERING DEVICE

[76] Inventor: John C. Newby, 41289 Malcolmson St., Fremont, Calif. 94538

[21] Appl. No.: 227,183

[22] Filed: Jan. 22, 1981

[51] Int. Cl.³ .............................................. F04F 1/02
[52] U.S. Cl. .................................. 417/138; 417/379; 60/641.14
[58] Field of Search ......................... 60/641.8, 641.14; 137/210, 576; 417/52, 65, 138, 379, 209

[56] References Cited

U.S. PATENT DOCUMENTS

| | | | |
|---|---|---|---|
| 2,230,917 | 2/1941 | Triana | 137/210 |
| 3,819,301 | 6/1974 | Jaster et al. | 417/209 |
| 3,834,835 | 9/1974 | Jaster et al. | 417/209 |
| 3,902,825 | 9/1975 | Quillen | 417/118 |
| 4,212,593 | 7/1980 | Chadwick | 417/209 |

FOREIGN PATENT DOCUMENTS 566956 10/1977 U.S.S.R. ............................... 417/379

Primary Examiner—William R. Cline
Assistant Examiner—John M. Kramer
Attorney, Agent, or Firm—Paul L. Hickman

[57] ABSTRACT

A solar powered liquid metering device is disclosed including a solar chamber sealed from atmospheric pressure and partialy filled with a liquid to be metered. Trapped within the device above the liquid is an expansible gas. Also included is an overflow chamber partially filled with the liquid and coupled to the solar chamber to allow fluid communication between the two bodies of liquid. An overflow pipe has an end located within the overflow chamber. When the gas expands due to solar heating liquid is forced from the solar chamber into the overflow chamber and then out the overflow pipe. Various mechanisms are described to keep the liquid level within the overflow chamber no lower than the lip of the overflow pipe.

7 Claims, 4 Drawing Figures

SOLAR POWERED LIQUID METERING DEVICE

BACKGROUND OF THE INVENTION

1. Field of the Invention

This invention relates generally to liquid metering devices.

2. Description of the Prior Art

Liquid metering devices serve a number of purposes in industry, agriculture and the home. For example, in U.S. Pat. No. 3,487,847 R. A. Scott describes a liquid level control device for providing water for small farm animals. Scott's device utilized a motorized compressor and feedback controls for forcing water from a main reservoir into a number of individual drinking bowls.

A number of other patents illustrate other uses for liquid metering devices. In U.S. Pat. No. 878,750 a liquid metering device is used as a liquid soap dispenser, in U.S. Pat. No. 3,486,525 a metering device is used in an ice cream making machine, and in U.S. Pat. No. 2,699,886 a device automatically meters a small amount of liquid deodorant onto soiled diapers. In U.S. Pat. No. 2,374,076 A. Burckhardt et al teaches a liquid level control means for providing liquids at two different levels which could be used as part of a liquid metering device.

All of the liquid metering devices found in the prior art either require electrical or mechanical energy input for their operation. For example, the device of U.S. Pat. No. 878,750 requires that a user push a button to receive a metered portion of soap. In U.S. Pat. No. 2,699,886 the device requires that a person open and close the diaper hamper lid to dispense a quantity of deodorant. And, of course, Scott's device requires electricity to run its compressor.

A problem that the prior art has not apparently addressed is how to provide a liquid metering device that does not require electrical or mechanical power for its operation. Such a device would be useful in locations where automatic operation is required and where providing electrical power is difficult or expensive.

SUMMARY OF THE INVENTION

It is an object of this invention to provide an automatic liquid metering device and which does not need to be electrically or mechanically powered.

It is a further object of this invention to provide such a device that is easy and inexpensive to build and maintain.

Briefly, the invention includes a solar chamber sealed from atmospheric pressure and partially filled with a liquid to be metered. The remaining volume of the solar chamber is filled with an expansible gas. The invention also includes an overflow chamber partially filled with the liquid and coupled to the solar chamber to allow fluid communication between the two bodies of liquid. An end of an overflow pipe is disposed within the overflow chamber to drain any liquid from the chamber that rises higher than a predetermined level.

When the gas within the solar chamber heats up and thus expands (usually due to solar radiation impinging upon the walls of the solar chamber) liquid is forced from the solar chamber into the overflow chamber and out the overflow pipe. The amount of water dispensed depends upon an number of climatic factors and upon the amount and type of gas trapped within the solar chamber. By varying the type and/or amount of gas within the solar chamber the amount of liquid dispensed in a daily cycle can be varied.

Preferably a mechanism is provided with the device for maintaining the liquid level within the overflow chamber. Three different mechanisms are described, including one having a pressurized liquid source coupled to the overflow chamber by a float valve assembly, and another utilizing an inverted reservoir which empties into the overflow chamber whenever the liquid within the chamber falls lower than a predetermined level.

An advantage of this invention is that it is solar, or more precisely heat, powered an thus does not require electrical or mechanical energy input for its operation.

Another advantage of this invention is that it is completely automatic and can used without supervision for considerable lengths of time.

Yet another advantage of this invention is that it is extremely simple mechanically and thus is inexpensive to produce and maintain.

These and other objects and advantages of the present invention will no doubt become apparent upon a reading of the following descriptions and a study of the several figures of the drawing.

DESCRIPTION OF THE PREFERRED EMBODIMENT(S)

Figure 1:
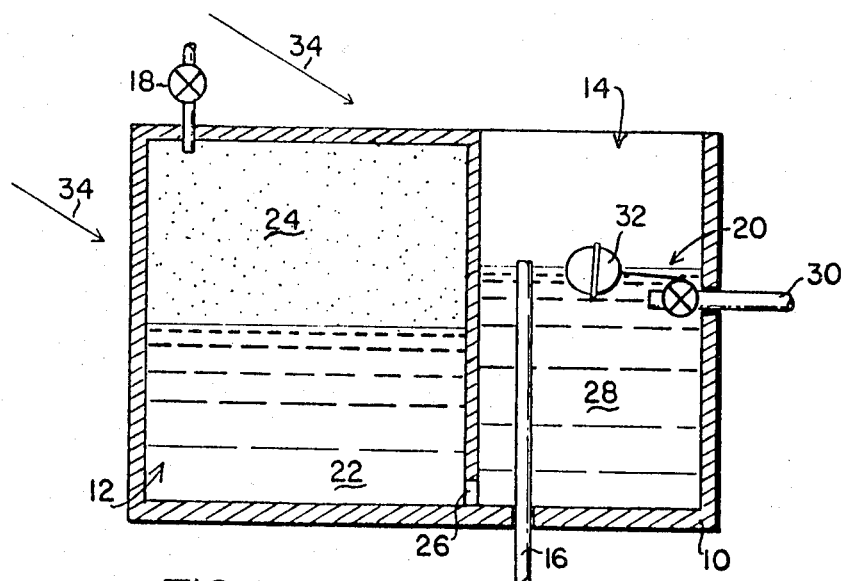
FIG. 1 is a cross sectional view of a solar powered liquid metering device in accordance with the present invention.

Referring to FIG. 1, a solar powered liquid metering device in accordance with the present invention is shown to include a large container 10 having a solar chamber 12 and an overflow chamber 14. Also included are overflow pipe 16, gas valve 18, and a float valve assembly 20.

Solar chamber 12 is sealed from atmospheric pressure, is partially filled with a liquid 22 to be pumped and is further filled with an expansible gas 24. For this device's most common application, liquid 22 is water and gas 24 is ordinary air. Gas valve 18 is normally closed but can be opened to introduce gas into the chamber or to remove gas from the chamber. A portion of the wall of chamber 12 is removed at 26 to allow fluid communication between chamber 12 and overflow chamber 14.

Overflow chamber 14 is open to atmospheric pressure and is partially filled a with liquid 28, again usually water. Overflow pipe 16 predetermines the maximum liquid level within the overflow chamber. Float valve assembly 20 is coupled to a pressurized liquid source or an elevated reservoir by a pipe 30. Float 32 of the valve assembly is adjusted so that the liquid level within the overflow chamber does not fall below the upper lip of overflow pipe 16.

A metering cycle begins with gas 24 in a relatively compressed state and with the water level in the overflow chamber level with the upper lip of the overflow pipe. As the sun's rays (as illustrated at 34) heat the solar chamber the gas 24 expands and forces some of liquid 22 through the wall of the chambers at 26 and into the overflow chamber. This causes the liquid level of chamber 14 to rise over the upper lip of the overflow pipe and from there flow to its ultimate destination. As the sun continues to heat the solar chamber more and more liquid will flow out of the overflow pipe.

If the amount of solar radiation decreases for any considerable length of time the gas 24 will contract. This causes liquid 28 to flow back into the solar chamber and thus lowers the liquid level within the overflow chamber. Float valve 32 will drop and liquid will flow into the overflow chamber via pipe 30. The float valve assembly will stop the flow when the liquid level within the overflow chamber is just below the upper lip of overflow pipe 16.

It will be noted that while solar energy is the anticipated power source of the device, it is more accurately heat differentials that cause the gas 24 to expand and contract. For example, even when the sun is shining steadily the ambient temperature around the device may be varying due to changing atmospheric conditions. Thus any variations in ambient heat will drive this solar metering device.

The amount of fluid metered is dependent upon four major factors: (1) the type of gas 24 within the solar chamber, (2) the amount of gas 24 within the chamber, (3) the magnitudes of the temperature differentials during the day, and (4) the number of temperature reversals during the day. By varying the type and amount of gas 24 within the solar chamber the amount of liquid metered out during a daily cycle can be pretty well judged given fairly stable climatic conditions.

Figure 2:
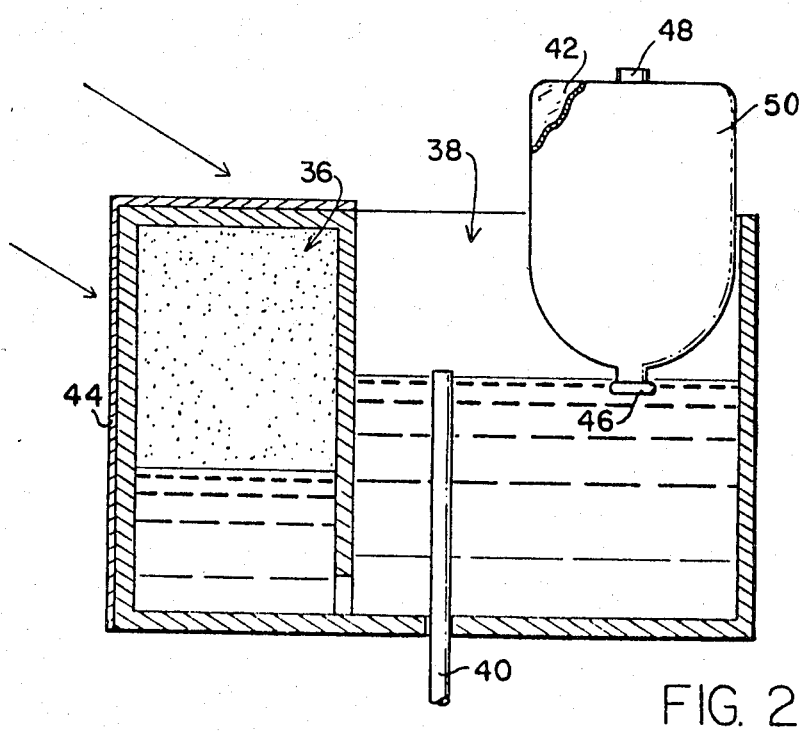
FIG. 2 is a cross sectional view of an alternate embodiment of a solar powered liquid metering device in accordance with the present invention.

In FIG. 2 an alternate embodiment of the present device is shown to include a solar chamber 36, an overflow chamber 38, an overflow pipe 40, and a reservoir 42. In this embodiment the outer wall surfaces of solar chamber 36 are covered with a solar absorptive coating 44. The simplest type of coating would be a flat black paint coating, although other and more exotic types of solar absorptive coatings could be used.

Reservoir 42 is an inverted jug shaped container having a mouth 46 at its lower end and a filler cap 48 at its upper end. The reservoir is initially completely filled with liquid, and is preferably covered with a solar reflective and insulating coating 50 to minimize temperature changes in the liquid it contains. When the liquid level in overflow chamber 38 falls below the mouth 46 of the reservoir liquid flows out of the reservoir until the liquid level in the overflow chamber is just below the lip of the overflow tube.

The cycling of the device of this embodiment is essentially the same as described above with the exception that the reservoir 42 maintains the liquid level within the overflow chamber.

Figure 3:
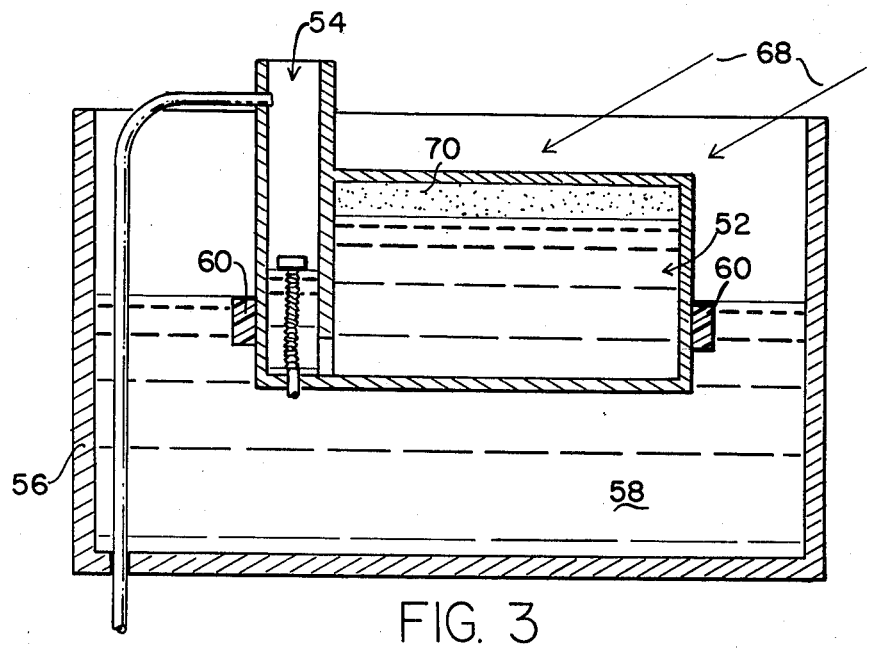
FIG. 3 is a cross sectional view of another alternate embodiment of a solar powered liquid metering device in accordance with the present invention.

A third embodiment of the present invention is generally illustrated in FIG. 3. In this embodiment the solar chamber 52 and the overflow chamber 54 float within a reservoir 56 filled with liquid 58. The two chambers are assisted in their flotation by flotation blocks 60.

Figure 4:
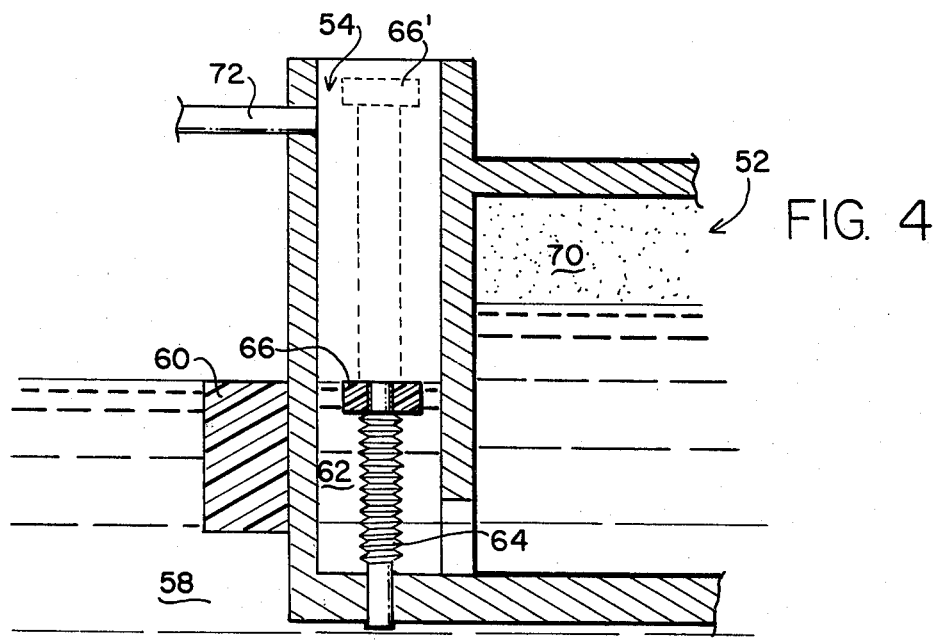
FIG. 4 is a partial cross sectional detail of the overflow chamber shown in FIG. 3.

In FIG. 4 the overflow chamber can be seen to take the form of a long, narrow tower vented to atmospheric pressure at its top and partially filled with liquid 62. Disposed within the tower is an expansible conduit 64 having a lower end open to the liquid 58 within the reservoir. The upper end of the conduit is attached to a flotation ring 66.

The operation of this embodiment is essentially the same as described in the previous embodiments. As solar radiation 68 heats gas 70 within solar chamber 52 liquid is forced up in the overflow chamber 54 until it flows out of an overflow tube 72. The mouth at the upper end of the expansible conduit 64 is kept above the liquid level by the flotation ring 66 as shown at 66'. When the gas 70 contracts and the liquid level in the overflow chamber falls below the level of liquid 58 in reservoir 56, liquid will flow into the overflow chamber until it levels with the reservoir level. The cycle is then repeated.

The uses for the various embodiments shown are many and varied. For example, building sized solar powered metering devices constructed from concrete could meter out clean, fresh water to herds of cattle. Smaller units could be used to seep regulated amounts of water through hydroponic gardens. Still smaller units could be used for drip feeding indoor plants or for renewing the water in a pet's water bowl.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. A solar powered liquid metering device comprising:
 a unitary container including:
   a solar chamber sealed from atmospheric pressure, said solar chamber containing a quantity of a liquid to be pumped in a lower portion thereof and an expansible gas filling the remaining volume thereof, said solar chamber having at least one wall adapted to be exposed to direct solar radiation, and
   an overflow chamber open to atmospheric pressure and also containing a quantity of said liquid, said solar chamber and said overflow chamber being separated by a wall having an opening at a lower end thereof to allow fluid communication between said liquid within said solar chamber and said liquid within said overflow chamber; and
 an overflow outlet opening within said overflow chamber for draining excess liquid from said overflow chamber that is above a predetermined level,
 filler means coupling a supply of said liquid to said overflow chamber and operative to permit liquid to flow from said supply into said overflow chamber when said liquid level within said overflow chamber is below said predetermined level, and
 valve means permitting a preselection of the amount of liquid metered out during an operating cycle by allowing the amount of gas within said solar chamber to be varied prior to the commencement of said operating cycle by opening said valve means and introducing or removing gas from said solar chamber, said valve means being normally closed during said operating cycle.

2. A solar powered liquid metering device as recited in claim 1 wherein said unitary container is substantially rectangular and wherein said wall adapted to be exposed to direct solar radiation and said wall separating said solar chamber and said overflow chamber are substantially planar.

3. A solar powered liquid metering device as recited in claim 1 wherein said solar chamber has a larger internal volume than said overflow chamber.

4. A solar powered liquid metering device as recited in claim 1 wherein said opening at the lower end of said wall separating said solar chamber and said overflow chamber is small with respect to the remaining surface area of said wall.

5. A solar powered liquid metering device as recited in claim 1 wherein in said overflow outlet comprises a vertically oriented pipe having an upwardly extending mouth opening within said overflow chamber.

6. A solar powered liquid metering device as recited in claim 1 wherein said filler means includes a float valve disposed within said overflow chamber, and means coupling said float valve to said supply of said liquid.

7. A solar powered liquid metering device as recited in claim 1 wherein said valve means comprises a valve mechanism coupled to said solar chamber, and means for coupling said valve mechanism to a gas source.

* * * * *